United States Patent [19]

Davis

[11] 4,261,108

[45] Apr. 14, 1981

[54] METHOD FOR DETERMINING CASTER CAMBER AND TOE-IN

[75] Inventor: Wilbert F. Davis, Sylvania, Ohio

[73] Assignee: Davis Wheel Aligning System, Inc., Sylvania, Ohio

[21] Appl. No.: 17,178

[22] Filed: Mar. 5, 1979

Related U.S. Application Data

[62] Division of Ser. No. 814,327, Jul. 11, 1977, Pat. No. 4,157,618.

[51] Int. Cl.³ .......................................... G01B 13/195
[52] U.S. Cl. .................................... 33/301; 33/203.18; 33/337
[58] Field of Search ............... 33/203.18, 203, 203.15, 33/335, 336, 337, 301, 288, 203.20, 203.21

[56] References Cited

U.S. PATENT DOCUMENTS

| | | | |
|---|---|---|---|
| 2,000,865 | 5/1935 | Seger et al. | 33/337 |
| 2,059,654 | 11/1936 | Quigley | 33/337 |
| 2,079,070 | 5/1937 | Johnston | 33/337 |
| 2,160,226 | 5/1939 | Phillips | 33/203.15 |
| 2,562,142 | 7/1951 | Frazee | 33/336 |
| 2,581,630 | 1/1952 | Carrigan | 33/336 |
| 2,781,587 | 2/1957 | Haucke | 33/335 |
| 2,846,774 | 8/1958 | Race | 33/335 |
| 3,409,990 | 11/1968 | Vorpahl | 33/288 |
| 3,417,479 | 12/1968 | Hirmann | 33/203.2 |
| 3,805,399 | 4/1974 | Price | 33/336 |
| 4,126,943 | 11/1978 | Senften | 33/203.18 |

Primary Examiner—William D. Martin, Jr.
Attorney, Agent, or Firm—Hugh A. Kirk

[57] ABSTRACT

The method of this invention comprises setting the vertical members clamped to the stationary part of the hub of each steerable wheel in the same plane as the turning axis for that wheel when the weight is off that wheel, and then gauging the chamber and caster from the pendular means and cooperating scale mounted on the vertical members after the wheel is again normally loaded or weighted. The toe-in angles of the steerable wheels are gauged relative to the direction of the non-steerable wheels when the steerable wheels are put in their straight ahead or forward position by the manual steering wheel therefor controlled by the operator of the vehicle.

3 Claims, 10 Drawing Figures

METHOD FOR DETERMINING CASTER CAMBER AND TOE-IN

This is a division of application Ser. No. 814,327 filed July 11, 1977, now U.S. Pat. No. 4,157,618.

BACKGROUND OF THE INVENTION

Previous caster and camber gauges for the steerable wheels of vehicles comprised either means that were affixed to the floor adjacent the wheel to be gauged, or means which were mounted on the wheel, such as on the rims against the face of the tire, or on the hub. The earliest of these devices comprised plumb bobs, later spirit levels were used, and the more recent devices comprised electronic apparatus and light beams. However, none of these devices could consistently duplicate their measurements even for the same vehicle because weight on the wheels, motion of the vehicle, the amount of air pressure in the tires, the change in direction of the steerable wheels, etc., all affect and change the caster and/or camber angles. No known previous apparatus set a vertical member in the same plane with the turning axis of the steerable wheel, without removal of the steerable wheel and anchoring the device directly to the turning axis, or to the kingpin for the steerable wheel.

Previous toe-in gauges comprised bars that measured the difference in distance between the fronts and the backs of the two substantially parallel aligned steerable wheels, or employed light beams which also were gauged by separate apparatus mounted on or adjacent the rear or non-steerable wheels. No direct comparison was made between the angle of the rear wheel on one side of the vehicle and the steerable wheel on the same side of the vehicle with the same gauge.

Thus the prior art devices measured only the caster, camber and toe-in angles of the steerable wheels themselves, and not these angles with respect to the turning axis of the steerable wheel and the alignment of the non-steerable wheels.

SUMMARY OF THE INVENTION

I - Apparatus

Generally speaking, the apparatus of this invention comprises four groups of parts for gauging the two front steerable wheels of four-wheeled vehicles, namely:

(1) stationary supports mounted along and adjacent each of the wheels of the vehicle to be gauged, each of which supports comprises a fixed pair of brackets, a bar removably mounted in said brackets and a slidable block removably mounted on the bar for adjustment of the blocks directly below the axis of each wheel;

(2) spindle adaptors, each of which comprises an axial extension clampable to and having an axially adjustable rod extending from the stationary hub of each steerable wheel, a plumb bob suspended from the rod, and an angularly adjustable vertical member also longitudinally adjustable across the end of the rod, which vertical member is to be set in the same plane as the steering axis, and which vertical member has a pendular indicator and cooperating scale for directly reading the caster and camber angles of the steerable wheel;

(3) right and left gauge plates removably and adjustably mounted on the slidable blocks for aiding in determining the adjustment of the vertical members from indications on the plates together with the cooperating plumb bobs suspended from the axial extensions of the steerable wheels; and (4) right and left toe-in gauges also removably and adjustably mounted on the slidable blocks, each of which toe-in gauges comprises a pair of separately vertically pivoted horizontal beams, one beam having a scale and the other linked to a pointer cooperating with the scale for indicating directly the toe-in of the steerable wheels.

If desired, a mounting board may be provided for mounting the separate pieces of the above mentioned parts.

The stationary supports or brackets and bars for the slidable blocks are mounted on the outsides of the wheel channels on a drive-on hoist or along the floor outside of the parallel wheel paths of a vehicle, such as for a drive-over pit. The slidable blocks are adjustable longitudinally of the vehicle along the bars, so that they can be moved to be directly vertically below the axes of each of the wheels, since the spacing of the axles of the wheels are different for different vehicles.

The gauge plates and toe-in gauges are slidable parallel to the axes of the wheels in grooves in the slidable blocks for adjustment for different width vehicles or spacing between their axially aligned pairs of wheels. Each groove is adjustable on its slidable block about a vertical axis, and a separate channel member may be provided for first aligning the complementary toe-in gauges for the right and left slidable blocks on their stationary brackets for the initial setting of these grooves.

Each gauge plate preferably is tiltable about an axis parallel to the axis of the wheel being gauged for permitting the gauge plate to be moved closer to the plumb bob as the steerable wheel is turned from left to right and vice versa between about 5° and 10° for setting up the proper angle for the vertical member.

II - Method

The method of carrying out this invention first comprises setting the stationary brackets along the paths that the wheels of the vehicle must take to be gauged, namely placing the aligned and parallel brackets for the stationary bars adjacent the outside of both the front and rear wheels of the normal four-wheeled vehicle with front steerable wheels. Once these brackets are anchored into position the slide bars are placed therein. Then the slidable blocks are placed on the bars and their transverse grooves are adjusted to be perpendicular to the paths of the vehicle. This is accomplished by setting the toe-in gauges face-to-face in their channel member for aligning their beams perpendicular to the channel member and then measuring the distances between adjacent ends of gauges when set in the aligned grooves of slidable blocks on opposite sides of the paths, and adjusting said grooves until they are aligned.

Now the apparatus is ready for use and the first vehicle to be checked is driven onto the paths, and the slidable blocks are adjusted onto their bars so that their grooves are directly under the axis of each wheel, which may be checked by the plumb bobs suspended from their hubs or hub extensions.

Next the front steerable wheels are jacked up or the weight of the vehicle is taken off them, their hub caps are removed, and the nuts that hold the wheels and bearings in place are removed. Then the right and left axial extensions of the spindle adaptors are clamped onto the stationary hubs against the wheel bearing with the same nuts that were just removed so that these adaptors are attached rigidly with the fixed hubs, and are not in contact with the freely rotatable wheels. The axial rod and its vertical member are adjusted in the clamped axial extension and the plumb bob is suspended from the rod for centering with the gauge plate placed in the groove of the slidable block.

The adjustment of the vertical member is determined by means of the gauge plate with its lines parallel to the longitudinal axis of the vehicle, one of which lines is closer to the vehicle being gauged by the depending end of the plumb bob so that as the wheel is turned, such as at least 5°, about its turning axis or kingpin, the plumb bob points to equally spaced distances on each side of the centerline of the wheel's axis. The vertical member is adjusted downwardly and angularly so that its lower end will point to the same one of one of the other parallel lines each side of this axis when the wheel is so turned. When this angular adjustment of the vertical member is obtained, it is longitudinally raised from the gauge plate and clamped in position as being in the same plane as the kingpin axis or turning axis of the steerable wheel.

Now the vehicle weight is put back on the steerable wheels or their jack released and/or removed, and the caster and camber may be read directly from the quadrant degree scale mounted on the lower end of the vertical member by the pointer at the lower end of the pendular means suspended from the upper end of the vertical member. The actual caster and camber reading is when the steerable wheels are placed in their forward position by the operator of the steering wheel of the vehicle. If this caster and camber angle is not correct, then the mechanic must make the proper adjustments of the bracket mounting for the wheel's kingpin or turning axis joints so that he can read on the scale on the vertical member the proper camber and caster angles prescribed for that vehicle. It should be noted that these angles change as the steerable wheel is turned or as the weight on the wheel changes due to the Ackerman geometry of such steerable wheel mountings.

The toe-in of the steerable wheels can now be determined by replacing the gauge plates in the grooves of the slidable blocks with the right and left toe-in gauges. These toe-in gauges are first adjusted in the slidable blocks adjacent the non-steerable rear wheels so their pointers are in their "0" positions on the scales of the one beams when their other or wheel engaging beams are placed flush against or in outer vertical planes of the rear non-steerable wheels, and then said one beams are clamped from angular movement about their vertical axes. The toe-in gauges are then placed on the slidable blocks adjacent the front steerable wheels so that the other beams are now flush or in the outer vertical plane of the front steerable wheels and their toe-in angles are read directly on their scales. Scales along the grooves in the sliding blocks can also indicate if the rear and front wheels are in alignment.

OBJECTS AND ADVANTAGES

Accordingly, it is an object of this invention to produce an efficient, effective, simple, accurate and economic caster and camber determining device for the steerable wheels of a wheeled vehicle.

Another object is to produce such a device which finds the plane of the axis of turn of each steerable wheel when the wheel is in a straight-forward position without weight thereon and without removal of the wheel, and then indicates the caster and camber angles of the steerable wheel when weight is on that wheel.

Another object is to produce such a device in which the toe-in of the steerable wheels also may be determined by an additional piece of apparatus that cooperates with part of the caster and camber determining apparatus, all of which apparati directly read the angles of caster, camber and toe-in.

Another object is to produce such a device wherein the changes in caster and camber angles can be observed directly as the steerable wheels are turned and/or the weight on them is varied.

Another object is to produce such a device in which the toe-in gauge is set from the non-turnable wheels neutralizing the Ackerman geometry of the steerable wheels and also indicating alignment of the front with the rear wheels.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a perspective view of the caster and camber and toe-in gauges in position for gauging the steerable wheel of an automobile according to a preferred embodiment of this invention;

FIG. II is a plan view of a pit and the dot-dash lined paths on tracks over which a four-wheeled vehicle with front steerable wheels is placed to be gauged by the apparatus of this invention, showing the positions of the stationary brackets, bars, and slidable blocks upon and with which the gauges shown in FIG. I are mounted, and with the toe-in gauges mounted in the front slidable blocks;

FIG. III is an enlarged perspective view of one of the stationary brackets, bars and slidable blocks mounted adjacent one of the four wheels of a vehicle on a vehicle hoist wheel track channel, with part of the slidable block broken away to show how its transverse groove can be adjusted;

FIG. IV is an enlarged perspective view of the spindle adaptor with its hub extension and vertical member as shown in FIG. I, attached to the hub for a steerable wheel (with the wheel removed) and showing the steering joints for the hub;

FIG. V is an enlarged perspective view of the gauge plate used in setting the angle of the vertical member shown in FIGS. I and IV with part of the plate broken away to show its tiltable mounting;

FIGS. VI and VII are perspective views showing respectively, the two gauging positions of the steerable wheel, plumb bob and vertical member using the gauge plate shown in FIG. V for adjusting the vertical means to be in the same plane as the turning axis of the steerable wheel;

FIG. VIII is an enlarged perspective view of the toe-in gauge as shown in FIGS. I and II, shown in an alignment channel with a complementary toe-in gauge shown in dot-and-dash lines;

FIG. IX is a reduced perspective view of the toe-in gauge shown in FIG. VIII against a vehicle wheel for setting or checking the alignment of that wheel;

FIG. X is one embodiment of a mounting board for and with all the right and left hand parts of the removable and adjustable apparatus shown in the previous views for checking the caster, camber and toe-in angles of a four-wheeled steerable vehicle.

DETAILED DESCRIPTION OF PREFERRED EMBODIMENT

Figure 1:
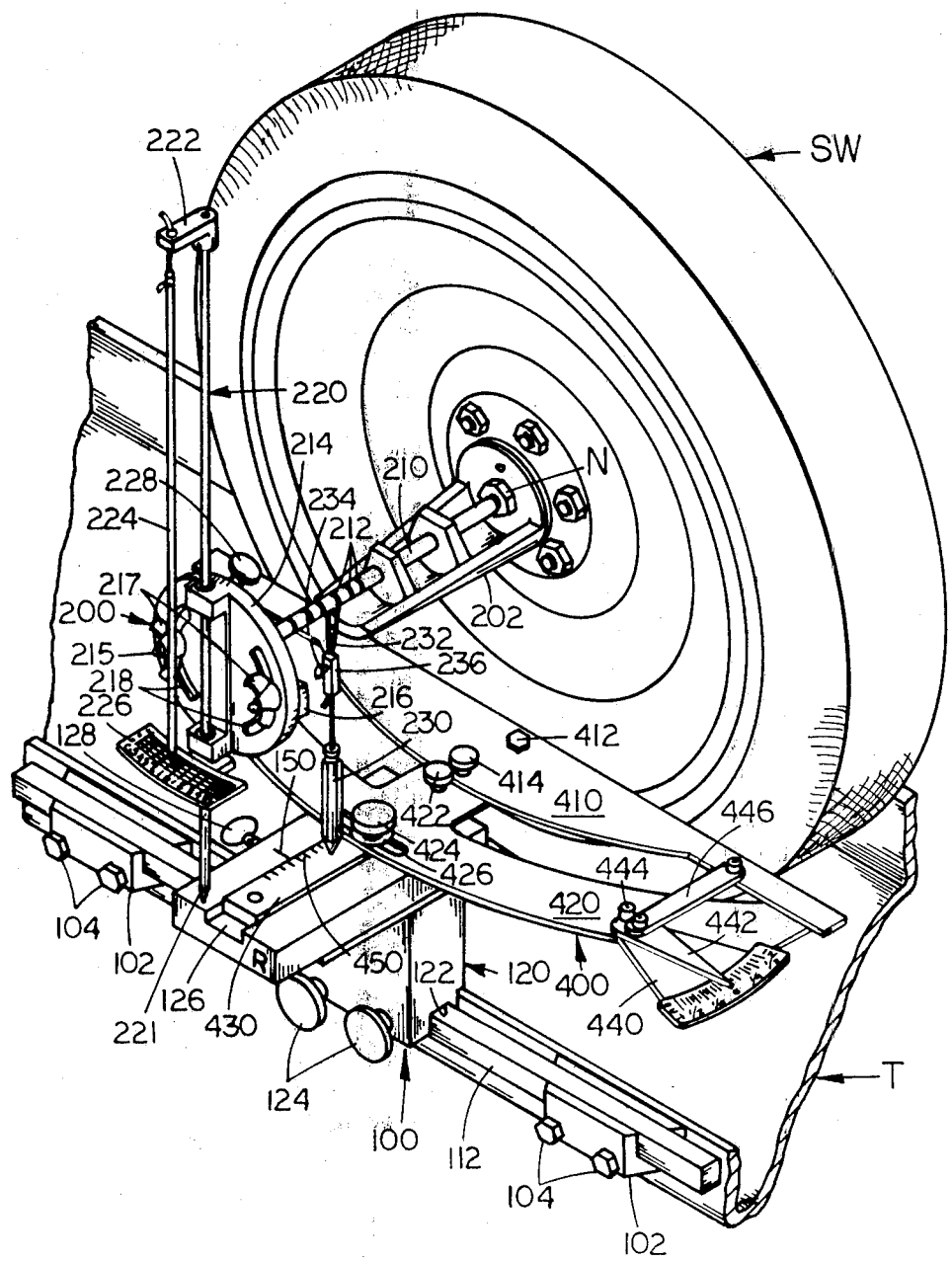
Figure 2:
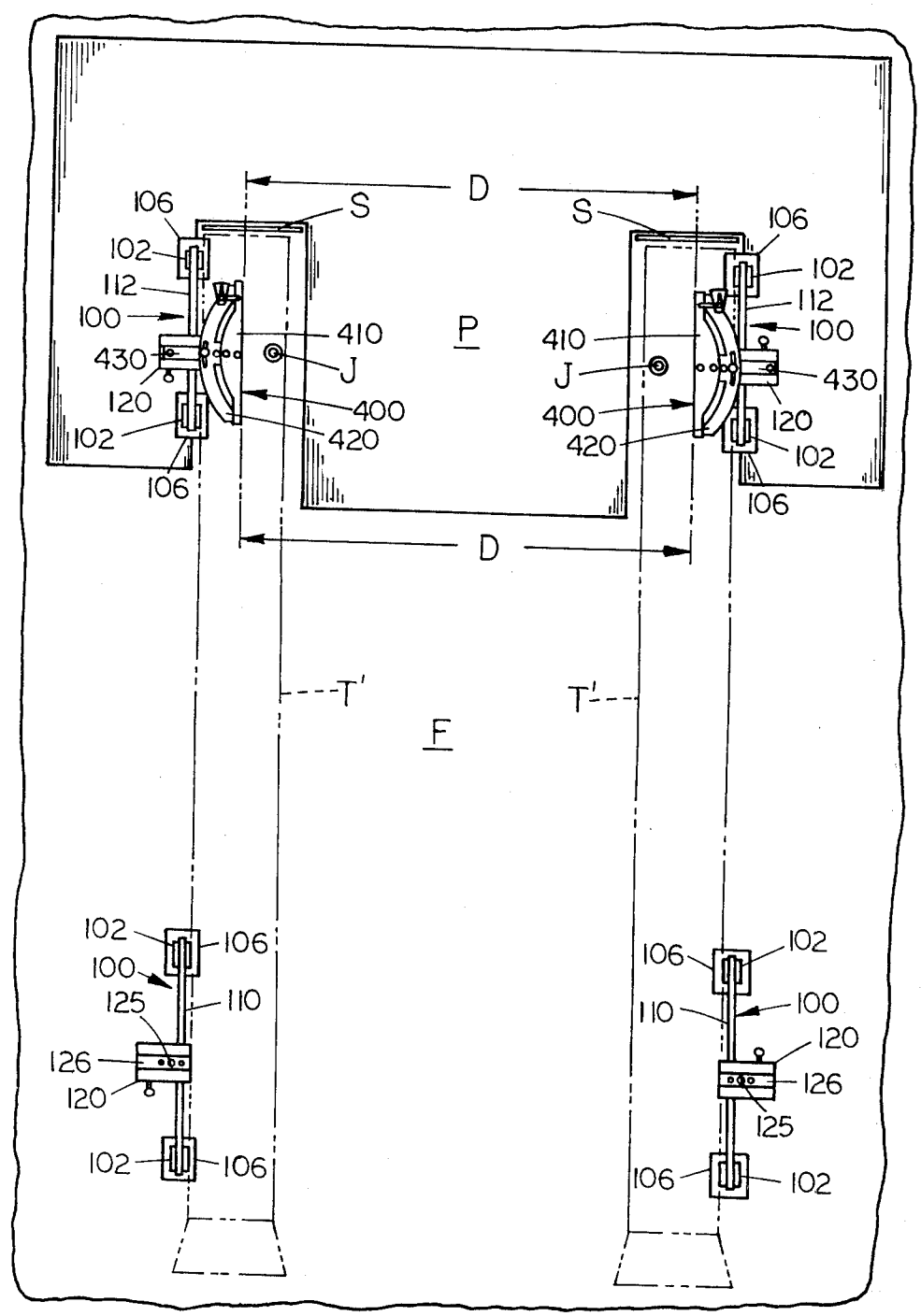
Figure 3:
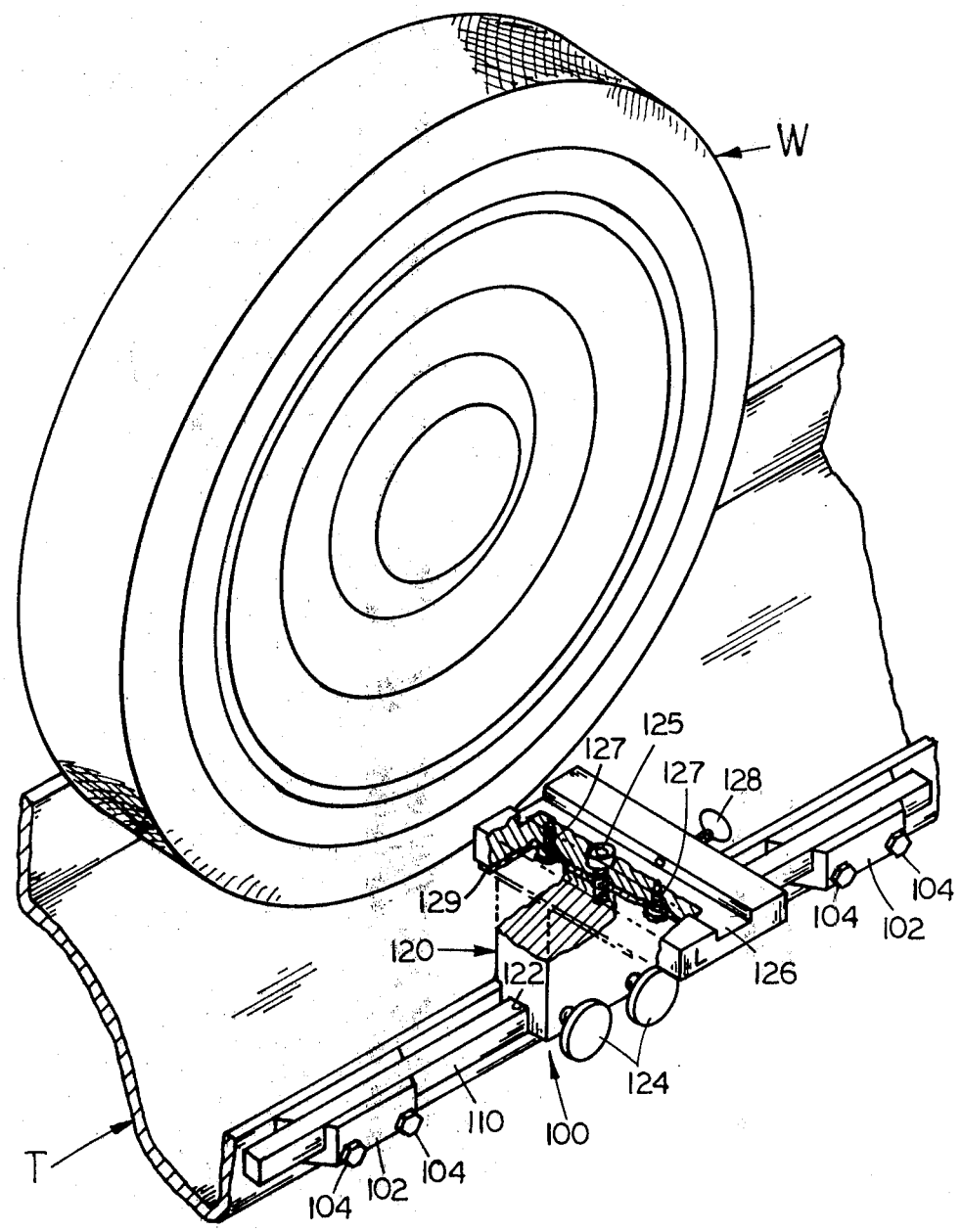
Figure 4:
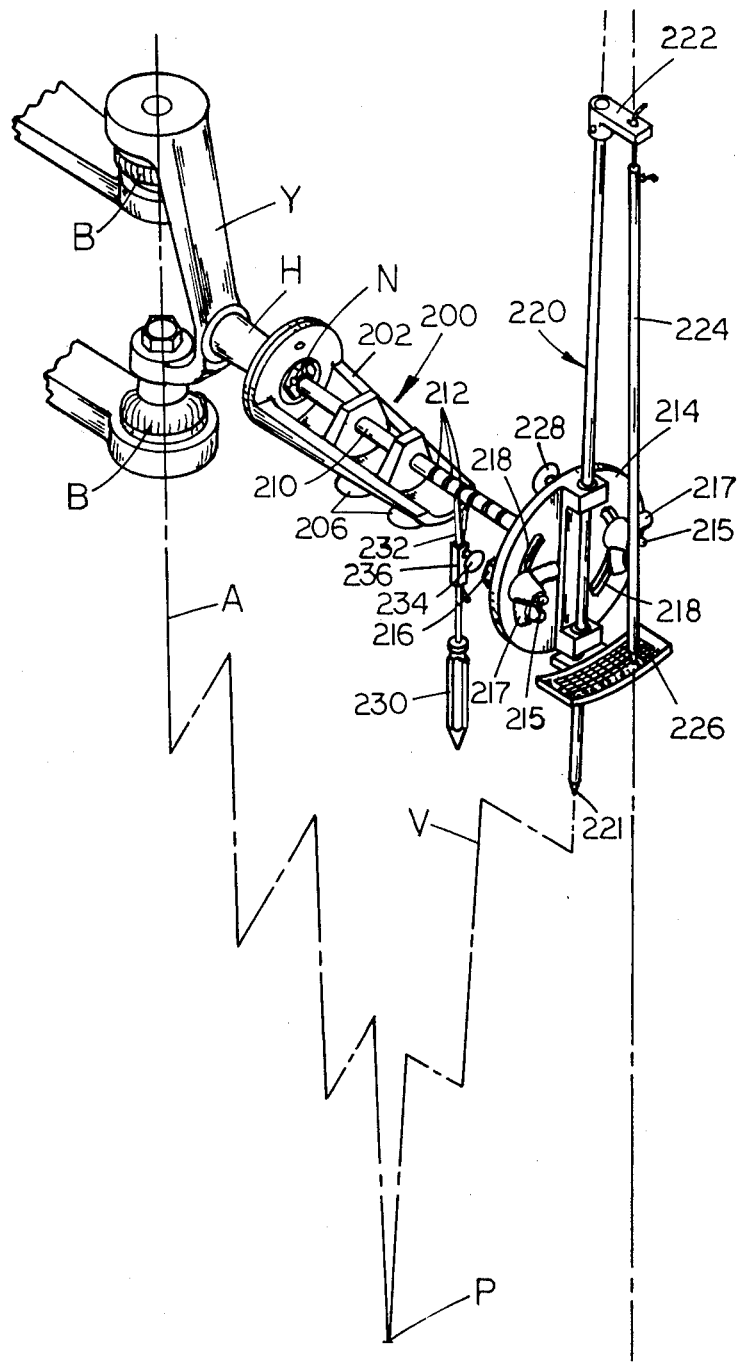
Figure 5:
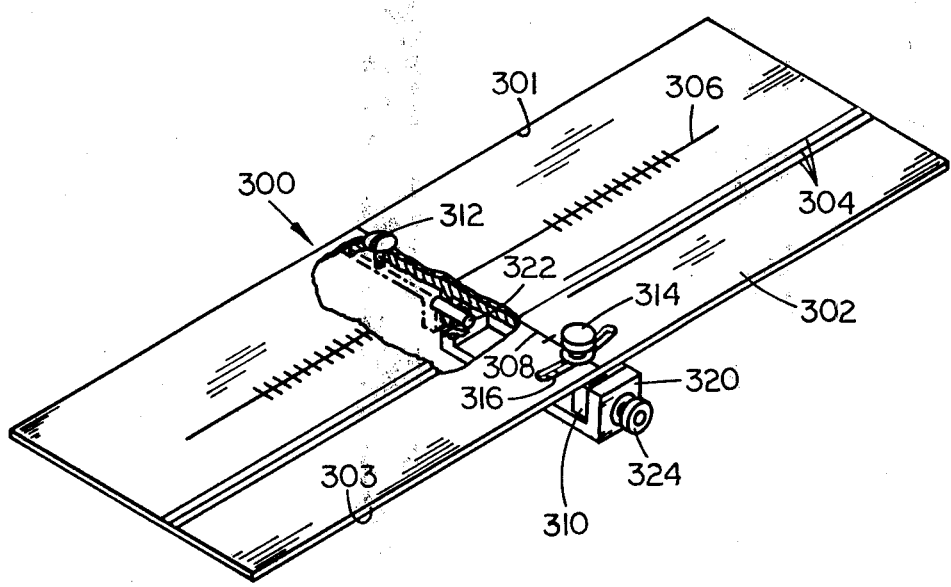
Figure 6:
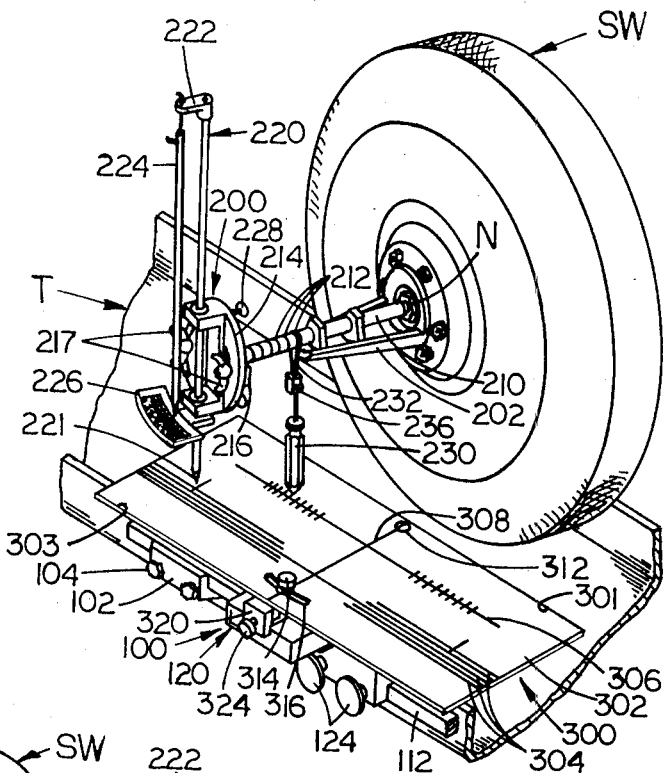
Figure 7:
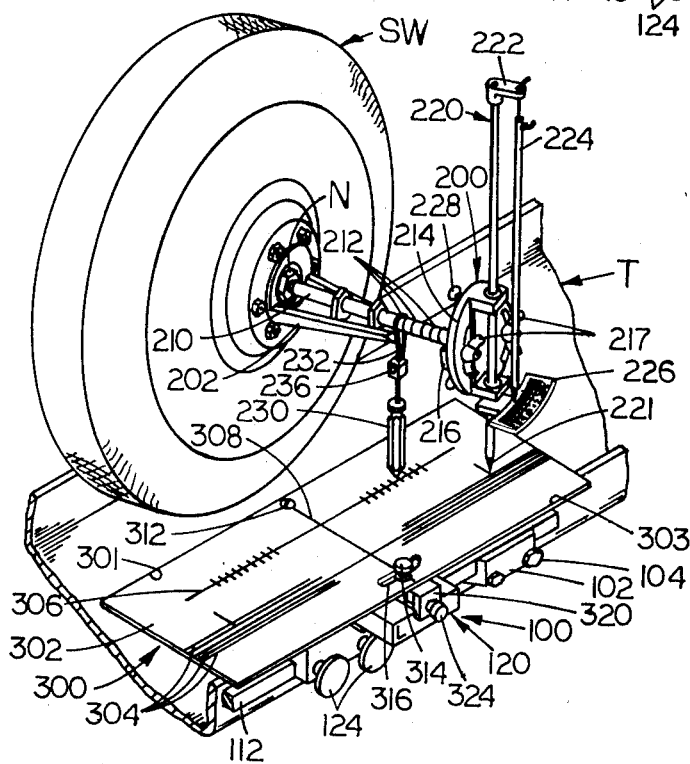
Figure 8:
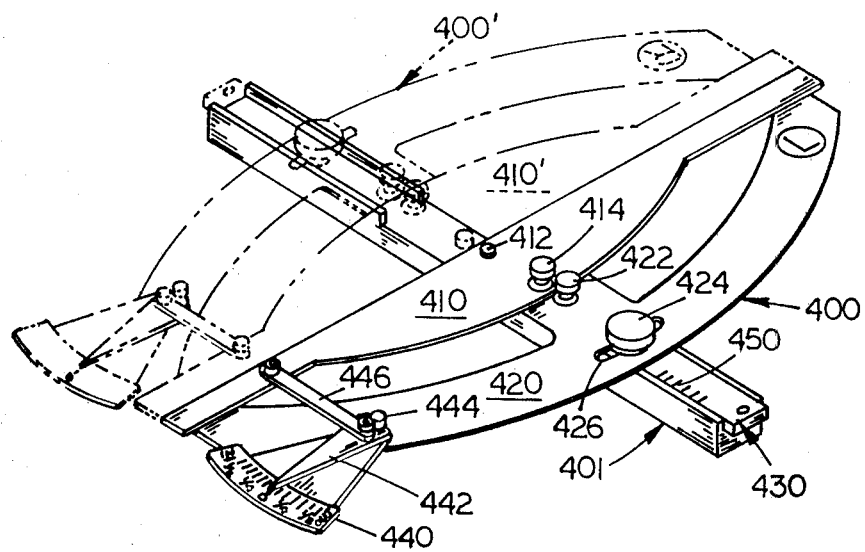
Figure 9:
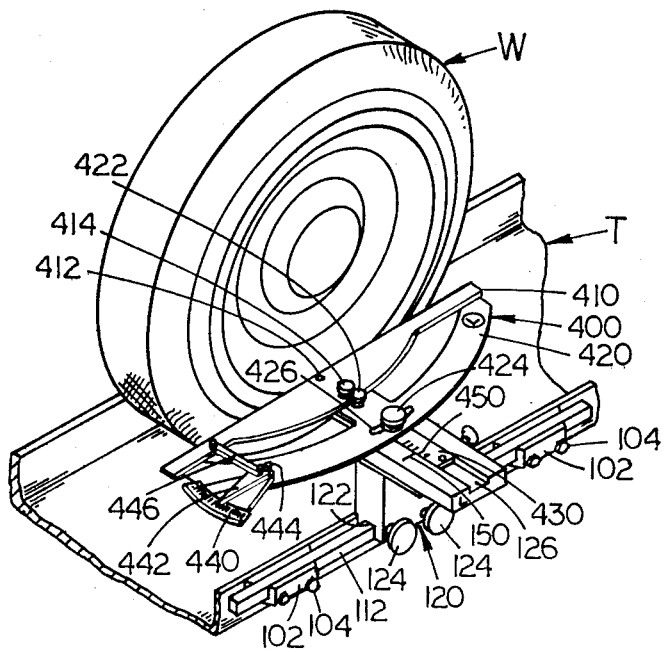
Figure 10:
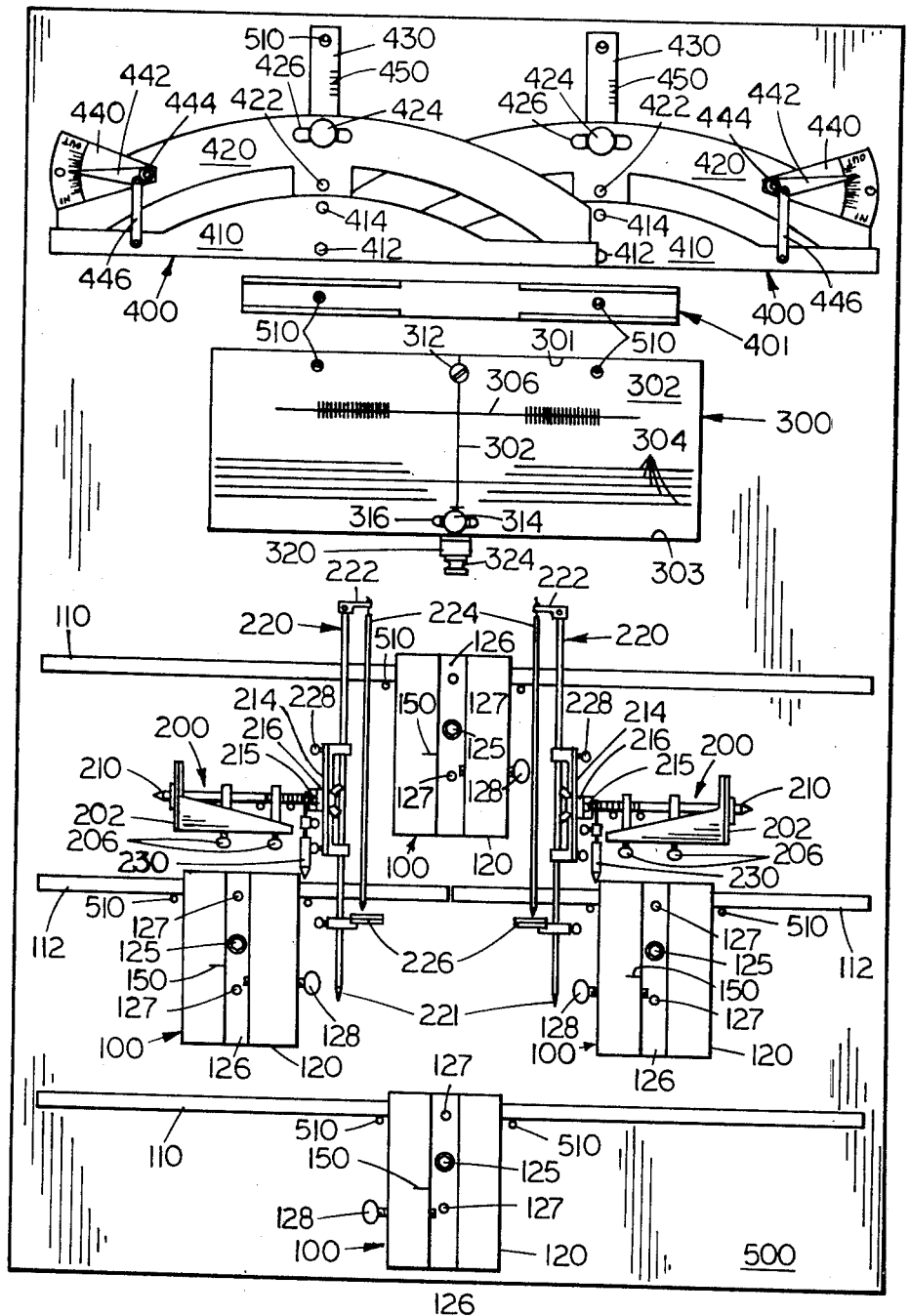

Referring first to FIG. I, there is shown a front steerable wheel SW of a four-wheeled automobile, which has attached thereto the apparatus of this invention. The supporting parts 100 of this invention, which are anchored to the floor F or side of the channel track T, slidably mount the gauge plate 300 (see FIGS. V through X) and toe-in gauge 400. The caster and camber gauge part or spindle adaptor 200 is mounted to the stationary hub H (see FIG. IV) or spindle of the steerable wheel SW to extend axially outwardly therefrom. Each of these different parts, given separate 1 through 4 hundred digits reference characters are described below in the following Chapters 1 through 4, respectively, and then their operation is described in Chapter 5.

CHAPTER 1 STATIONARY SUPPORTING PARTS 100

Referring now to FIGS. II and III there are disclosed channel brackets 102 which may be bolted onto the outer side rail of the channel track T as shown in FIGS. I and III by bolts 104, or these brackets 102 may be bolted onto plates 106 as shown in FIG. II, which plates 106 are anchored to the floor F. Pairs of these channel brackets 102 are aligned and spaced farther apart at the rear of the vehicle than they are at the front of the vehicle for supporting, respectively, parallel pairs of longer and shorter bars 110 and 112, each of which is adjacent and parallel to the outer vertical plane side of each vehicle wheel. A stop S is generally provided at the forward end of each of the tracks T or T' for stopping the front steerable wheels SW of the vehicles, so they are usually located close to the same spot. However, since vehicles differ in length, longer bars 110 are required for bridging the varying distances of the rear wheels W from the front steerable wheels SW of different vehicles, so that the slidable blocks 120 mounted on these bars 110 and 112 can have their centers aligned vertically below the axes of each of the vehicle wheels.

These sliding blocks 120 herein have a general T-shaped configuration with the leg of the "T" having a transverse groove 122 therein for straddling the bars 110 and 112. Adjacent the grooves 122 are one or more knobbed clamping screws 124 for anchoring the sliding blocks 120 in position vertically under the axes of the wheels W or SW. For the rear or non-steerable wheels W, the blocks 120 may be positioned by sight from the center of the hubs of the wheels W as shown in FIG. III, and for the front steerable wheels SW it may be accurately aligned by means of a plumb bob 230, as shown in FIG. 1, suspended from the rod 210 of spindle adaptor 200 described in Chapter 2.

The head of the T-shaped bracket 120 is provided with a transverse groove 126 which is positioned to be parallel and vertically below the axis of each one of the wheels of the vehicle. The grooves 126 may be initially adjusted to be perpendicular to the tracks or paths T or T' by means of the pivot screws 125 (see FIGS. III and X) anchored into the leg portions of the T-shaped slidable blocks 120, and are locked in position by the screws 127 extended up through the head of the integral head plates 129 on top of the leg portion. This positioning is made by setting the two toe-in gauges 400 face-to-face in a common channel 401 (see FIG. VIII), adjusting their scales to indicate "0", and locking their beams 410 and 420 to their supporting slidable bars 430. Thus these gauges are set in the grooves 126 of two opposite slidable blocks 120 as shown in FIG. II and the distances D are measured to be the same from both adjacent ends of the locked beams 410. The side of each groove 126 may be provided with a clamping thumb screw 128 for anchoring the slidable support bars of the gauges 300 or 400, which gauges are mounted therein as will be described in Chapters 3 and 4, respectively.

Since it is substantially impossible to insure that the stationary supporting parts 100 in all their four different locations will be so aligned that their bars 110 and 112 and slidable blocks 120 can be interchanged, these bars 110 and 112 and slidable blocks 120 are preferably marked "left" and "right" and "forward" and "rear", so that once they ae properly set-up they can be removed and returned to the same position without having to be reset or realigned.

There is also shown in the FIG. II a pair of jacks J under the front wheel positions in order to remove the weight of the vehicle from the steerable wheels SW for installing and adjusting the vertical members 240 of hub spindle adaptors 200 described in Chapter 2. Also in FIG. II the apparatus is shown on a floor F with the front or steerable wheel ends of the paths or tracks T' surrounded by a pit P, the paths of the tracks T' for the vehicle wheels being shown in dot-dash lines.

CHAPTER 2. CASTER AND CAMBER GAUGE PARTS 200

Referring now first to FIGS. I and IV, the decorative hub cap is taken off of the steerable wheels of the vehicle and then the grease cap for the bearings so as to obtain access to each wheel nut N which holds the bearings in place and the wheels on the bearings on the stub spindle or hub H formed integral with the yoke Y pivoted at its ends in bearings B aligned along the turnable axis A of the steerable wheel SW. The nut N is removed and the axial extension member 202 of the spindle adaptor 200 is then rigidly anchored by the nut N against the bearing and hub H to be fixed with the yoke Y and extend radially outwardly along the wheel axis. Mounted in the extension member 202 and axially of the wheel axis is an axially adjustable extending rod 210 which may be clamped from axial movement by thumb screws 206 threaded into the member 202. The outer end of the rod 210 may be provided with grooves 212 for preventing slippage of the adjustable loop 232 of the plumb bob 230 along the rod 210. The length of this loop 232 may be adjusted by thumb screw 234 in slide 236 to raise or lower the plumb bob 230 from the rod 210. This plumb bob 230 not only aids in aligning the support 120 below the axis of the wheel SW when in its straight-ahead position, but also aids in setting the vertical means 220 transversely and diametrically mounted in an angularly adjustable plate 214 mounted on the outer end of the extension rod 210. This disc 214 may be supported by a pair of diametrically spaced bolts 215 mounted on a cross bar 216 anchored to the outer end of the shaft 210, which bolts 215 have clamping wing nuts 217 for clamping the angle of the disc 214 with respect to the end of the fixed extension 210 within the limits of the complementary arcuate slots 218 in the disc 214. The angular adjustment of this disc 214 is for positioning the longitudinal axis V of vertical means 220 in the same plane as the steering axis A so that the center lines A and V will meet at a point P and the actual camber and caster angles of the steering axis A will correspond with the position of the axis V of the vertical means.

Fastened to the upper end of the vertical means 220 is a bracket 222 from which may be suspended a pendular indicating rod or means 224 which cooperates with a direct reading caster and camber degree scale 226 attached below the pointer end of the indicator rod 224 and on the opposite side of the disc 214. Thumb screws 228 may be provided in the plate 214 for adjusting and anchoring the longitudinal movement of the vertical means 220 and thus the cooperation of the lower pointed indicator end 221 of the vertical means 220 with the gauge plate 300 described in the following chapter.

CHAPTER 3 GAUGE PLATE PART 300

Referring now to FIGS. V through VII, there is shown a gauge plate 300 comprising a rectangular platform 302 marked on its upper surface with a series of parallel lines 304 and spaced therefrom another parallel line 306, all longitudinally of the plate 302, plus a transverse centerline 308. This plate 302 is anchored to a bar 310 below and along the centerline 308 by means of a pivot screw 312 on one side of the plate 302 and a thumb screw 314 extending through an arcuate slot 316 on the other side of the plate 302 for adjustment of the plate so that the parallel lines 304 and 306 on the plate 302 can be adjusted to be parallel with the outer vertical plane of the steerable wheel SW by pushing the inner longitudinal edge 301 of the plate 302 against the face of the wheel SW and then tightening the thumb screw 314.

The bar 310 is longitudinally pivotly mounted on an axle 322 in a similar bar 320 slidably seated in the groove 126 in slide block 120 for support of the gauge plate part 300. When the wheel SW is swung or turned from one position to the other to opposite ends of the plates as shown in FIGS. VI and VII, respectively, the camber and/or caster angles of the axis A causes the plumb bob 230 and the pointed end 221 of the vertical means 220 to be raised and lowered with respect to the horizontal. Thus by being able to tilt the plate 302 about the axle 322, the plumb bob 230 and pointer end 221 can be adjusted to be substantially the same distance from the plate 302 when being read. Also this tilt may be clamped, if desired, by means of a thumb screw 324 at the outer threaded end of the axle 322.

As previously stated, the weight has been removed from the steering wheel SW by the jack J in order to place the adaptor 200 onto the end of the stub shaft S and the wheel SW is still suspended as it is turned or oscillated about its steering axis A from one side to the other as shown in FIGS. VI and VII into positions wherein the plumb bob 230 just touches the line 306 the same distance on each side of the transverse centerline 308. Before turning the wheel SW into the positions shown in FIGS. VI and VII, the steerable wheels SW should be placed by the manual steering wheel into their straight-forward position, and the plate 302 and its supporting block 120 be adjusted so that the plumb bob 230 points directly onto the transverse line 308 on the gauge plate 302.

In order for the axis V of the vertical member 220 to be in the same plane as the axis A, the pointed lower end 221 of the vertical means 220 must in each of the two extreme angled positions shown in FIG. VI and VII, be angularly adjusted with respect to the rod 210 so that it will point to the same parallel line 306 in each of these two angled positions in FIGS. VI and VII. If the pointer 221 is off by a certain distance in one position from that of the other, the disc 214 and means 220 are angularly adjusted about rod 210 so that half of this distance is compensated for by the pointer 221. Then if this adjustment is properly done, the pointer 221 will point to the same line 304 in each of the angled positions in FIGS. VI and VII, but if not, the adjustment must be repeated until it is the same, and then the wing nuts 217 are clamped and this whole assembly 200 is now rigidly fixed so that the axes A and V are in the same plane and the cater and camber angles of the axis A can now be directly read under all conditions by pendular pointer 224 on the degree scale 226, since the vertical member 220 remains fixed with respect to the steering axis A. The gauge plate 300 is now removed, and the vertical member 220 may be longitudinally adjusted diametrically of the disc 214 by the thumb screws 228.

Now the weight is placed back upon the steerable wheel SW, that is the jack J is released so that the wheel is again resting on its track T or T'. Next the steerable wheels SW are turned by the manual steering wheel for the vehicle to be in their straight-forward position. In this position the caster and camber angles are directly read by the pendular indicator pointer 224 on the scale 226. The caster and camber angle readings should correspond with those prescribed by the manufacturer of that vehicle, and if not, the shims for adjusting the caster and camber angles should be changed until the proper prescribed caster and camber angles have been obtained.

It should be understood that changes in weight on the steerable wheels SW, rocking of the vehicle, and/or turning of the steerable wheel SW, will change caster and camber angle readings on the scale 226 due to the flexibility or compressibility of the tires on the wheels SW and the spring suspension of the vehicle. Nevertheless, the relative positions of the axes V of the vertical means 220 with respect to the corresponding steering axes A will always remain the same.

CHAPTER 4 TOE-IN GAUGE PARTS 400

Referring now to FIGS. VIII and IX, there is shown in FIG. VIII the right-hand one of the pair of toe-in-gauge assemblies 400 mounted on the channel bar 401 in which it may be set and lined up with the left-hand toe-in gauge 400' shown in dotted lines mounted on the other end of the bar 401 so that their co-operating beams 410 and 410' can be accurately placed face-to-face for setting their "0" indicator positions and relative alignment, for the purposes of initially positioning and aligning the grooves 126 of the slidable block 120 as described in Chapter 1 above. Then according to the system of this invention, the toe-in plates 400 are first set against the rear or unsteerable wheels W (see FIG. IX) with its slidable mounting bar 430 mounted in the groove 126 of the adjacent support 120, and then against the front or steerable wheels SW to measure their toe-ins.

The toe-in gauge 400 comprises the slidable bar 430 upon which are separately vertically pivotly mounted a wheel engaging beam 410 and back of it an arcuate segment shaped beam 420; the former of which is pivoted to the bar 430 by the bolt or pivot means 412 and clamped in position by a thumb screw 414, and the latter or arcuate beam 420 being pivoted by the bolt or pivot means 422 to the beam 430 and clamped in position by the thumb screw 424 which operates in an arcuate slot 426 in the beam 420. At one end of the beam 420 there is rigidly anchored a sector scale 440, the arcuate edge of which may be calibrated in inches, centimeters, or degrees, as desired, which edge is scanned over by a pointer 442 pivoted at 444 near the apex of the sector scale 440 and linked by a link 446 to the adjacent end of the pivoted beam 410.

As stated above, the separate toe-in gauges 400 are first placed with their beams 410 flush against the outer vertical plane of the rear wheels W as shown in FIG. IX with both their beams 410 and 420 unclamped by knobs 414 and 424 for free pivotal movement about their vertical pivots 412 and 422, respectively. Then each arcute beam 420 is adjusted so that the pointer 442 points to the center "0" position on the scale 440 and the arcuate beam is clamped in position by tightening the thumb screw 424.

Now the toe-in gauge assembly 400 is removed from the rear wheel slidable block 120 and placed upon the front wheel slidable block 120 on the same side of the vehicle, since the gauge plate 300 already has been removed therefrom. The wheel engaging beam 410 is pressed flush against the flat vertical side of the front wheel SW while the front wheel is still in the straight forward steering position, and the toe-in or toe-out is directly read on the scale 430 for that wheel. The same operation is carried out for the toe-in gauge on the opposite side of the vehicle. Now the mechanic may adjust the steerable wheels SW so that the toe-in is in accordance with that prescribed for the vehicle.

Furthermore, if desired, the bar 430 of the toe-in gauge 400 may be calibrated at 450 on its upper surface as shown in FIGS. VIII and IX so that the relative alignment of the front and rear wheels SW and W of a vehicle can be checked against cooperating lines 150 adjacent the grooves 126 on the front and back slidable blocks 120.

CHAPTER 5 METHOD OF OPERATION

First referring to FIG. X, there is shown a display panel 500 with pins 510 upon which all of the parts of the apparatus previously described may be hung, displayed and stored when not in use, so that the right and left-hand articles can be readily selected and placed in their proper positions and not be mixed up, and consistent and accurate readings can be obtained on any vehicle including the same vehicle when it is rechecked after road testing.

The description of the operation of the device of this invention will be in part repetitive to what has been stated before regarding the description and function of the specific parts of the apparatus. However, with the apparatus now described, the steps involved in the complete operation of this apparatus, including installation of the apparatus or equipment, are as follows:

(a) First the channel brackets 102 are installed and anchored in place so that the bars 110 and 112, when removed and replaced therein will always be in parallelism with each other. Thus in setting this up, careful measurements should be taken to insure that this is the case.

(b) Then, as soon as the vehicle or automobile is driven into position, either on the tracks T' or the lift channels T as shown in FIG. II or III, with its front wheels adjacent the forward stops S, the bars 110 and 112 with their respective T-shaped slidable blocks 120 are then mounted beside each of the wheels of the vehicle with their grooves 126 vertically below each wheel's axis.

(c) Then the front or steerable wheels SW of the vehicle are raised by jack J so as to remove all the weight of the vehicle therefrom.

(d) Next the hub caps and grease caps are removed from the steerable wheels so the nuts N that hold the wheels in place can be unscrewed and the axial extension members 202 of the adaptor brackets 200 can be fixedly bolted onto each of the hubs H by the nuts N, leaving the steerable wheels SW free to rotate on their hubs H.

(e) After the member 202 has been bolted to the hub H, the other parts of the adaptor 200 are attached to the member 202 by insertion of the rod 210 with its disc 214 and vertical means 220 into the extension member 202 and adjusted axially so that the plumb bob 230 and pointer 221 are over the groove 126 and then clamped by wing nuts 206.

(f) The corresponding slidable bar 320 of the gauge plate 300 is now placed in the groove 126 of the support 120 and the inner longitudinal edge of its plate 302 is pushed flush against the outer vertical plane face of the steerable wheel SW when the wheel is in its straight-ahead steering position and then the screw knob 314 is tightened for setting the lines 304 and 306 on the plate 302 parallel with the direction of this steerable wheel. Then the gauge plate assembly 300 is slid in the groove 126 until the pointer 221 is inside the outer longitudinal edge of the plate 302 and adjacent the outer line 304, and the plumb bob 230 is adjusted along the rod 210 so that it points to line 308 between the lines 304 and line 306; then the slidable bar 320 is clamped by thumb screw 128. The length of the plumb bob 230 is then adjusted by thumb screw 234, so that the pointer end of the plumb bob 230 is just above the centerline 308 of the plate 302.

(g) The steerable wheel SW can now be turned or oscillated about its steering axis A as described in Chapter 3 above for the setting of the axis V of the vertical means 220 in the same plane as its steering axis A.

(h) After this the gauge plate 300 is removed from the support 120 and the jack J is released so that the steerable wheel SW is resting again with its normal weight on the track T or T' and the caster and camber angles can be read directly on the scale 226, in all positions and loadings of this steerable wheel SW.

(i) Next the toe-in gauges 400 are set against the non-steerable or back wheels W and adjusted so that their pointers 442 indicate the "0" position on their scales 440 and their arcuate beams 420 are clamped by thumb screw 424. Thus the toe-in of the steerable wheels SW is gauged relative to the alignment of the non-steerable wheels W.

(j) Now the toe-in gauges so set by the non-steerable wheels W are placed against the front or steerable wheels as shown in FIG. I and described above in Chapter 4, and when the beam 410 is pushed flush against the front steerable wheel the toe-in or toe-out relative to the rear non-steerable wheel is directly readable on the scale 440 by the pointer 442. Similarly, the toe-in of the steerable wheel on the other side of the vehicle is gauged.

(k) Also the alignment between the front and back wheels on each side of the vehicle can be checked by the scale 450, indications with respect to the marks 150 on the front and back blocks 120.

(l) After the proper caster, camber and toe-in have been set, the front wheels SW are jacked up again for removing the adaptors 200 and for placing the nuts N back on the hubs H for holding the wheels and their bearings in position. Then the hub caps can be replaced and the jacks J removed and the vehicle is ready for driving from the track T or T' and use by the operator.

It should be understood that other types and shapes of plumb bob means and vertical indicators for the adaptors 200 may be used, and that it is possible to combine the indications of the gauge plates 300 with those of the toe-in gauges 400 without departing from the scope of this invention.

While there is described above the principles of this invention in connection with specific apparatus and a specific method, it is to be clearly understood that this description is made only by way of example and not as a limitation to the scope of this invention.

I claim:

1. A method of determining the caster and camber angles of a steerable wheel of a vehicle comprising:
   (A) taking the weight off the steerable wheel,
   (B) clamping an axial extension means onto the stationary hub of the steerable wheel,
   (C) setting this steerable wheel in its straight-forward direction by the manual steering wheel of the vehicle,
   (D) transversely setting on said clamped extension means a vertically extending member in the same plane as the turning axis of the steerable wheel indicated when oscillations of said steerable wheel to the right and left cause a plumb bob and said vertically extending member to point to places equidistant from the axis of said steerable wheel in its straight-forward direction,
   (E) placing the weight back on the steerable wheel, and
   (F) indicating directly the angle of said vertically extending member to the true vertical to indicate the camber and caster angle of the steerable wheel.

2. A method of determining the caster and camber angles and toe-in of a steerble wheel of a vehicle having also a non-steerable wheel, comprising:
   (A) taking the weight off the steerable wheel,
   (B) clamping an axial extension means onto the stationary hub of the steerable wheel,
   (C) setting the steerable wheels in their straight-forward position by the steering wheel of the vehicle,
   (D) transversely setting on said clamped extension means a vertically extending member in the same plane as the turning axis of the steerable wheel indicated when oscillations of said steerable wheel to the right and left cause a plumb bob and said vertically extending member to point to places equidistant from the axis of said steerable wheel in its straight-forward direction,
   (E) placing the weight back on the steerable wheel,
   (F) indicating directly the angle of said vertically extending member to the true vertical to read the camber and caster angle of the steerable wheel,
   (G) determining the alignment of the non-steerble wheel by a toe-in gauge placed thereby, and
   (H) placing said toe-in gauge by said steerable wheel for measuring the difference in angular alignment between the non-steerable wheel and the steerable wheel.

3. A method according to claim 2 including measuring the offset alignment between the non-steerable wheel and the steerable wheel.

* * * * *